J. J. MARCAIS.
Apparatus for Raising Water, &c.
No. 198,645. Patented Dec. 25, 1877.
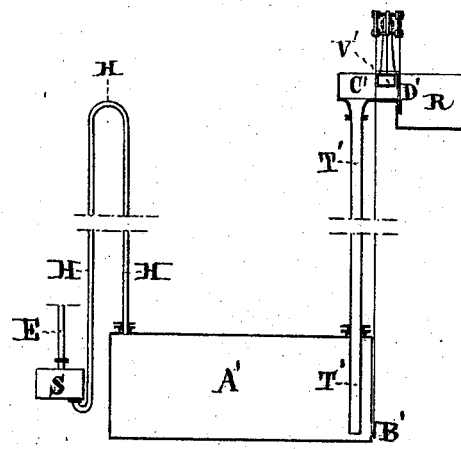
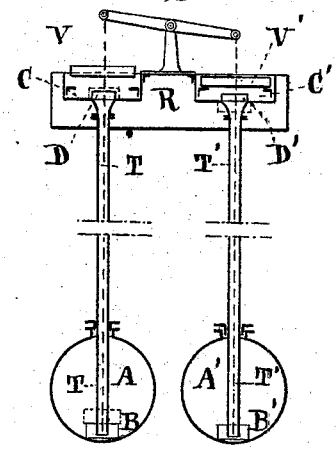
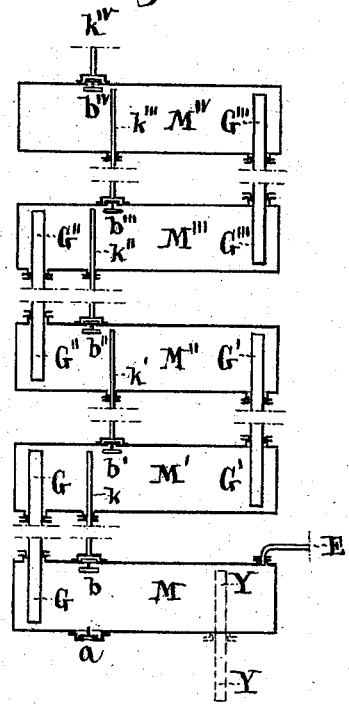
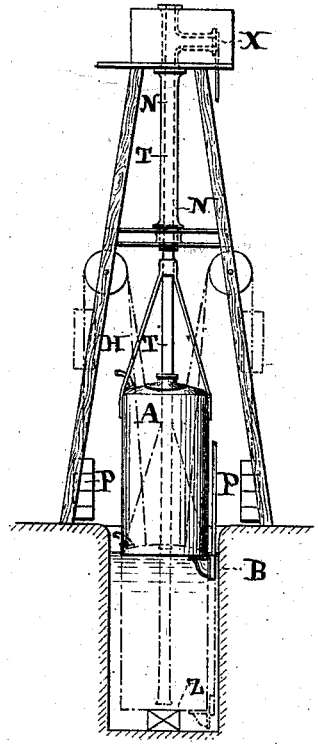
Witnesses
Inventor

UNITED STATES PATENT OFFICE.

JOSEPH JEAN MARÇAIS, OF PARIS, FRANCE.

IMPROVEMENT IN APPARATUS FOR RAISING WATER, &c.

Specification forming part of Letters Patent No. 198,645, dated December 25, 1877; application filed November 20, 1877.

*To all whom it may concern:*

Be it known that I, JOSEPH JEAN MARÇAIS, of Paris, in the Republic of France, have invented certain new and useful Improvements in Apparatus for Drawing up Water and other Liquids to any altitude, of which the following is a full, clear, and exact description.

The apparatus, subject-matter of this patent, consists of an accumulator of power and an ascending column, utilizing the power accumulated.

The accumulator (shown in Figures 1 and 2) consists of two receivers, A A', each having an aperture, B B', at its base, closed by a sluice-valve, and of a liquid-reserve, R, maintained at a constant level. At the top of the reserve are two basins, C C', each communicating with it by an aperture, D D', provided with a sluice-valve, each basin containing a float, which works the above-named valves. The sluice-valves are so arranged that, when the aperture of either of the basins is uncovered, that of the corresponding receiver is closed, and vice versa. A pipe, T T', proceeds from the bottom of each basin, and terminates in the lower portion of the corresponding receiver. The floats V V', and also the rods of the sluice-valve, are jointed to the two ends of a lever of the first kind with equal arms. A siphon-shaped air-tube, H H H, Fig. 1, connects the top of each receiver with the bottom of a single small receiver, S, Fig. 1, half full of liquid. A single pipe, E E, Fig. 1, connects the upper portion of this small receiver with the upper portion of the first or lower vessel of the ascending column. This vessel M, Fig. 3, is submerged in the liquid, a portion of which is to be raised. It has an aperture at the bottom, furnished with a valve, $a$, Fig. 3, opening inward, and another aperture at the top, with a valve, $b$, Fig. 3, closing outward, which is kept open by its own weight, and is closed by a float when the liquid rises to the top of the vessel. A pipe, G G, proceeds from near the bottom of the first vessel and enters the second, M', extending to the upper portion of the latter. The difference of height between the base of the first vessel, M, and the top of the second, M', is always less than that between the top of the receivers A A' and bottom of the basins C C', Figs. 1 and 2. The second vessel, M', is provided at the top with a valve, $b'$, similar to that in the first, and similar valves $b'' \ b''' \ b^{\mathrm{iv}}$, at the respective tops of all the other vessels M'' M''' M$^{\mathrm{iv}}$, are arranged in like manner; but they may be simple clack-valves, made of india-rubber, leather, or other like material, kept open by slight power, sufficient to prevent closing before being acted upon by the pressure of the accumulator.

A pipe, G', proceeds from near the bottom of the second vessel, M', and enters the third, M'', to nearly the top thereof, in a similar manner as with M and M', and so on for the whole height of the column. The valve-aperture $b$ at the top of the first vessel M communicates with the inside of the second vessel, M', by a small pipe, $k$, passing through the bottom of the latter, and terminating a short distance below its cover. Similar pipes $k' \ k''$ $k'''$, &c., connect the different valves $b' \ b'' \ b'''$, &c., of vessels M' M'' M''', &c., with the respectively next superposed vessel to the top of the column. This depends upon the number of vessels, which is determined by the elevation of the basins with respect to the receivers, as well as by the height to which the liquid is sought to be elevated.

Working of the apparatus: The aperture D' in the bottom of the first basin, C', being open, and the aperture B' in the bottom of the first receiver, A', closed, the corresponding apertures D in the second basin, C, and second receiver, A, being respectively closed and open, all the clack-valves $b \ b' \ b'' \ b''' \ b^{\mathrm{iv}}$, &c., in the tops of the ascending column of vessels being open, and the valve $a$ at the bottom of the lowest, M, of these vessels resting in its seat, then, if liquid is first introduced round the first vessel, M, it will lift the valve $a$ in the bottom of such vessel, drive the air out through the valve $b$ in the top, and fill the said vessel M, when it will close the float-valve $b$ in the top. The liquid, then being allowed to enter the reserve R, and the aperture D' in the bottom of the first basin being uncovered, will enter the basin C', whence it will fall by the connecting-pipe T T', into the first receiver, A', the bottom aperture B' of which is closed; it will fill this receiver, expel the air through the siphon-pipe H into the small receiver S, and enters the first vessel, M, of the ascending column, the water of which it will drive before it into the second vessel, M', the valve b' in the top of that vessel being open, and those a and b in the bottom and top of the first or lowest vessel being closed under the pressure of the air as it enters, and this operation will be repeated until the last or highest vessel in the column is filled, when the liquid will overflow.

As all the vessels are in communication with the atmosphere by means of each other, they will be in equilibrium with it. The entire column will then return to the same state at which it was at the commencement of the operation, and it will be sufficient for the first or bottom vessel to become full again, that the air-pipe communicating with the small receivers be closed during the necessary interval. The lower vessel being filled and the water-pipe being again opened, everything will again take place as before.

If the receiver A' were infinitely larger than the aggregate of the vessels M' M'', &c., the liquid would thus overflow periodically indefinitely; but in practice this condition cannot be attained, and therefore the receiver A' would, at a given time, become full of liquid and incapable of operation, and it is for this reason that there are periodic stops when it becomes necessary to empty it. This is an inconvenience, to avoid which I deem it preferable to use two combined receivers, A A'. In this way, if A' be filled, the liquid would rise into basin C', lift the float V', which closes the aperture D' and opens aperture B'. Both basins C C' and receiver A' will then empty themselves; but float V', in rising, depresses float V, which opens aperture D and closes aperture B. Receiver A will then commence to operate in place of receiver A', while the latter is being emptied. When receiver A and its basin C become filled, then float V will rise, closing aperture D and opening aperture B, while float V' descends, opening aperture D' and closing aperture B', and so this operation may alternately continue and produce upon the column continuous action.

In some cases the following, among other modifications of details, may be adopted:

First, the small receiver S, with its siphon-shaped pipe H, acts as a safety device to prevent air from returning into the receivers A A' when they are being emptied. A valve closing inward may be fixed on each of the two large receivers, in substitution for the small receiver and bent pipe.

Second, when the liquid overflows on the top of the column the air under pressure in this column escapes, and the submerged vessel M becomes filled by the liquid entering the bottom valve, which is lifted. In order that this may take place, it is necessary that the vessel M should not be subjected to the action of the air proceeding from the receivers A A'. This may be accomplished by causing the pipe E to pass in the immediate neighborhood of the water at its point of issue from the column, and, by providing the pipe at any desired point with a cock, closing at the right time by the action of the water which flows therefrom, and reopening automatically when the flow ceases, the lower vessel, immersed in the water, fills itself freely by means of the valve at its base, which is lifted. The arrangements for determining the precise moment for closing the cock in question and the period for which it should remain closed would vary with each apparatus erected.

Third, the air-exit orifices b b' b'', &c., in the top of each vessel, and furnished with tubes k k' k'', turned into the vessel immediately above, may be made mere openings, or be governed by valves; but I prefer the arrangement shown in the drawing, as inconvenience and trouble attending the imperfect closing of the valves are thereby obviated.

Fourth, it is important that the water passing through the pipes T T', connecting the receivers with the basin, should carry as much air with it as possible. These pipes must therefore, as far as circumstances will permit, be provided with the well-known arrangements given to water-blowing machines.

It may be advisable to alter or modify the arrangements (hereinbefore shown and described) of the accumulator and ascending column. This may be effected in cases where the fall is inconsiderable by suspending, as shown in Fig. 4, a cylinder, A, vertically above the level of the lower body of the liquid, balancing the cylinder by counter-weights P P, as in gas-holders. A pipe, T T, passing vertically through the center of the cylinder, slides easily in the sleeve N N or socket (fixed vertically above the center of the cylinder and terminating in an upper basin) for a length slightly greater than the height of the cylinder A, which, together with its pipe, is capable of rising and falling freely.

Let us suppose the cylinder A at its greatest height—namely, out of the lower body of liquid. If at this instant the orifice X at the upper end of the sleeve be opened and the valve B, at the base of the cylinder closed, the liquid in the upper basin, which communicates with the sleeve or socket, will enter the cylinder, which will be plunged into the liquid of the lower basin until it rests on the support Z, which is so arranged as to keep the top of the cylinder out of the liquid. If at the instant the cylinder touches the support Z, on which it rests, the valve B at the base of the cylinder is opened, and that, X, at the upper end of the sleeve closed, the liquid will begin to run out of the cylinder in consequence of the excess of pressure caused by the portion of the cylinder remaining out of the liquid, and the cylinder itself, becoming gradually lighter in proportion as the water runs off, will rise under the action of the counter-weights till, when completely empty, it regains its former position.

In order to admit the air at the proper time for discharging the liquid, the dome of the cylinder may be provided with a self-acting cock, which may be worked by the cylinder itself; but if, on reaching the top of the stroke, the upper orifice X is opened and the lower one, B, is closed, the liquid will again begin to enter, and the operation will be repeated as before.

The alternate workings of the valves or slides X and B may be effected directly by the rise and fall of the cylinder, or by suitable combinations of rods and buffers.

A portion of the air-tube H should be flexible to admit of following the motion of the cylinder, or it should slide upon itself by means of a joint-socket of sufficient length, and similar to that previously described.

In some cases, and in order to obtain a good continuous working, the number of accumulators may be increased. The arrangement above described utilized the whole height of fall, minus the few inches necessary for determining the flow of liquid in the cylinder at the bottom of its stroke, and the rising of the latter. In the ascending column the arrangement which causes the air to pass through the same pipe as the liquid gives good results in small appliances, and as these pipes are of small sectional area, the air entering at their lower ends when the vessels are emptied constitutes a piston, and forces through them all or the greater portion of the liquid which they contain. Such is not the case in larger appliances. The air acting upon the lower end of the column of liquid passes through the pipe, and only carrying part of the liquid, the rest may form a secondary column at the base of the pipe sufficiently high to create an air-pressure sufficient to close the air-valve, causing shocks at first, which, if numerous, might result in a stoppage. This difficulty may be avoided by leading the air entirely through separate air-tubes $k$ $k'$ $k''$ $k'''$, &c. On the top of each of these tubes a small lever of the first order is mounted, carrying at one end a rigid rod working in guides, which descends into the interior of the tube until it touches the closed valve, and at the other end a float resting in its seat when the vessel is empty, but, rising under the action of the liquid, reaches the top of the vessel. The float in rising depresses the rod, which opens the valve at the bottom, and gives passage to the air. Let us suppose that that it is the vessel M' above the lowest which is in question, the opening of the valve $b$ in the air-tube leading from the cover must take place at the instant preceding that in which the air would enter the pipe rising from the lowest vessel to the one above—viz., when the surface of the liquid in the lowest vessel is level with the bottom of the said pipe. This is what happens: the air entering the second vessel, M', causes the liquid to fall from the pipe G G, connecting the first and second vessels, after which it acts so as to continue the raising action of the pipe G' G'' leading from the second to the third vessel.

It is necessary that the opening of the valve by the float should only take place when the filling is complete. In some cases it might be useful to insert the ends of the air and liquid tube in a small dome placed at a slightly greater elevation.

The same float of the second vessel, M', which opens, by inverse action, the valve $b$ in the air-tube leading from the cover of the lowest vessel may, by direct action, simultaneously close the air-valve $b'$ in the cover of the second vessel.

It has been seen from the preceding explanations that the valve $a$ in the bottom of the lowest vessel of the ascending column remains in action during the whole time required for the liquid to rise through the successive stages to the top of the column. If the successive stages were numerous, this valve might become a source of danger, being, in fact, liable to arrest substances in suspension in the liquid, and the interposition of one of them would suffice to cause an escape of liquid in the first instance, and an escape of air afterward. It is therefore simpler in most cases to dispense with this valve, and substitute for it a plunger-pipe, Y Y, open at both ends, rising to the top of the vessel, and descending outside into the liquid to a sufficient depth to prevent the air from forcing the liquid through its base, and thus escaping. The plunger-pipe is shown in Fig. 4 in dotted lines.

It is advisable, when a plunger-pipe is thus employed, to immerse the lowest vessel to a sufficient depth with a view to enabling its being filled more rapidly.

Such being its general arrangement, and in detail the apparatus made in accordance with my said invention, I would observe that the principal and characteristic features of my invention consist in the following: first, the elevation of liquids without increasing the pressure of the ascending column by reason of the elevation attained; second, operating at any distance or height by means of air-conduits from the accumulator to the ascending column; third, elevating any kind of liquid for motive-power purposes.

Having thus described my said invention, and the manner in which the same is or may be carried into effect, what I claim, and desire to secure by Letters Patent, is—

The combination, in an apparatus for raising liquids, of an accumulator of power and an ascending column, utilizing the power accumulated, the same consisting of receivers, basins, reservoirs, pipes, and valves, arranged substantially as herein shown and described, whereby the use of air-pumps or independent air-condensers is dispensed with, substantially as herein set forth.

In testimony whereof I have signed my name to this specification before two subscribing witnesses.

J. J. MARÇAIS.

Witnesses:
EMILE BARRAULT,
AUG. VINCK.